(12) United States Patent
Liu et al.

(10) Patent No.: US 12,261,736 B2
(45) Date of Patent: Mar. 25, 2025

(54) SCALABLE EVENT DRIVEN AUTO-DIAGNOSIS SYSTEM

(71) Applicant: Google LLC, Mountain View, CA (US)

(72) Inventors: Hui Liu, San Ramon, CA (US);
Hongkun Yang, San Jose, CA (US);
Gargi Adhav, San Jose, CA (US);
Tianqiong Luo, San Clara, CA (US);
Aspi Siganporia, Mountain View, CA (US);
Rob Enns, Mountain View, CA (US);
Lakshmi Sharma, Mountain View, CA (US);
Manasa Chalasani, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/817,330

(22) Filed: Aug. 3, 2022

(65) Prior Publication Data
US 2023/0038986 A1 Feb. 9, 2023

Related U.S. Application Data

(60) Provisional application No. 63/260,032, filed on Aug. 6, 2021.

(51) Int. Cl.
*H04L 41/0677* (2022.01)
*H04L 41/0866* (2022.01)
*H04L 41/14* (2022.01)

(52) U.S. Cl.
CPC ...... *H04L 41/0677* (2013.01); *H04L 41/0866* (2013.01); *H04L 41/14* (2013.01)

(58) Field of Classification Search
None
See application file for complete search history.

(56) References Cited

U.S. PATENT DOCUMENTS

| 9,888,397 B1 | 2/2018 | Puranik et al. | |
| 2011/0314138 A1* | 12/2011 | Kobayashi | G06F 11/3476 709/222 |
| 2018/0115469 A1* | 4/2018 | Erickson | H04L 43/026 |

(Continued)

OTHER PUBLICATIONS

Narain, Sanjai, Rajesh Talpade, and Gary Levin. "Network configuration validation." Guide to Reliable Internet Services and Applications. London: Springer London, 2010. 277-316. (Year: 2010).*

(Continued)

*Primary Examiner* — William G Trost, IV
*Assistant Examiner* — Christopher P Cadorna
(74) *Attorney, Agent, or Firm* — Honigman LLP; Brett A. Krueger

(57) ABSTRACT

A method for scalable event driven auto-diagnosis systems includes obtaining a data packet configured for transmission across a network from a source address to a destination address. The method includes obtaining a list of changes to the network. The method also includes analyzing, based on a network model, the data packet using a plurality of analyzers. The method includes correlating the list of changes to the network and the analysis of the data packet. The method further includes determining, based on the correlation between the list of changes to the network and the analysis of the data packet, a configuration status of the network. The method also includes reporting the configuration status to a user.

22 Claims, 5 Drawing Sheets

(56) References Cited

U.S. PATENT DOCUMENTS

2021/0075689 A1\* 3/2021 Ramanathan ......... H04L 41/147
2021/0152416 A1 5/2021 A et al.
2021/0243068 A1\* 8/2021 R ....................... H04L 43/0823

OTHER PUBLICATIONS

Huang, Peng, et al. "Confvalley: A systematic configuration validation framework for cloud services." Proceedings of the Tenth European Conference on Computer Systems. 2015. (Year: 2015).\*
Bai, Xuefeng, et al. "Distribution network reconfiguration validation with uncertain loads—network configuration determination and application." IET Generation, Transmission & Distribution 10.12 (2016): 2852-2860. (Year: 2016).\*
International Search Report and Written Opinion for the related Application No. PCT/US2022/074497 dated Nov. 18, 2022, 113 pages.

\* cited by examiner

SCALABLE EVENT DRIVEN AUTO-DIAGNOSIS SYSTEM

CROSS REFERENCE TO RELATED APPLICATIONS

This U.S. patent application claims priority under 35 U.S.C. § 119(e) to U.S. Provisional Application 63/260,032, filed on Aug. 6, 2021. The disclosure of this prior application is considered part of the disclosure of this application and is hereby incorporated by reference in its entirety.

TECHNICAL FIELD

This disclosure relates to scalable event driven auto-diagnosis systems.

BACKGROUND

The majority of network outages (e.g., 60-85%) can be blamed on configuration changes. Due to the complexity of cloud network configurations, it is difficult for network admins to validate new configurations across many different feature dependencies. Unintended breakage often occurs due to changes in different areas for different reasons. There are also often outdated, inconsistent, and/or incomplete configurations that are costly to maintain, discover, and fix, and their existence pose risk to the customer's network.

SUMMARY

One aspect of the disclosure provides a method for scalable event driven auto-diagnosis. The method, when executed by data processing hardware, causes the data processing hardware to perform operations that include obtaining a data packet configured for transmission across a network from a source address to a destination address and a list of changes to the network. The operations include analyzing, based on a network model, the data packet using a plurality of analyzers. The operations also include correlating the list of changes to the network and the analysis of the data packet. The operations include determining, based on the correlation between the list of changes to the network and the analysis of the data packet, a configuration status of the network. The operations include reporting the configuration status to a user.

Implementations of the disclosure may include one or more of the following optional features. In some implementations, at least one analyzer of the plurality of analyzers includes a default analyzer that analyzes a set of default rules. In other implementations, at least one analyzer of the plurality of analyzers includes a custom analyzer that analyzes a set of custom rules provided by the user. In these implementations, the set of custom rules may include Internet Protocol (IP) range classification. Further, the set of default rules may include a firewall configuration rule. In various implementations, the configuration status may include any of one or more configuration errors, a list of resources affected by the one or more configuration errors, or at least one recommendation for adjusting a configuration of the network.

Further, analyzing the data packet may include parsing, by the plurality of analyzers, the network model to retrieve network information. In some implementations, the operations include obtaining an indication indicating a configuration of the network has changed and a second data packet configured for transmission across the network. In these implementations, the operations include determining, based on the changed configuration of the network, a subset of the plurality of analyzers. In these implementations, the operations include analyzing, based on the network model, the second data packet using the subset of the plurality of analyzers. In these implementations, the operations also include determining, based on the analysis of the second data packet by the subset of the plurality of analyzers, a second configuration status of the network. In these implementations, the operations include reporting the second configuration status to the user.

In some examples, the operations include, after a predetermined amount of time has elapsed since reporting the configuration status to the user, determining, based on analysis of a second data packet, a second configuration status of the network and reporting the second configuration status to the user.

Another aspect of the disclosure provides a system for scalable event driven auto-diagnosis systems. The system includes data processing hardware and memory hardware in communication with the data processing hardware. The memory hardware stores instructions that when executed on the data processing hardware cause the data processing hardware to perform operations. The operations include obtaining a data packet configured for transmission across a network from a source address to a destination address and a list of changes to the network. The operations include analyzing, based on a network model, the data packet using a plurality of analyzers. The operations also include correlating the list of changes to the network and the analysis of the data packet. The operations include determining, based on the correlation between the list of changes to the network and the analysis of the data packet, a configuration status of the network. The operations include reporting the configuration status to a user.

This aspect may include one or more of the following optional features. In some implementations, at least one analyzer of the plurality of analyzers includes a default analyzer that analyzes a set of default rules. In other implementations, at least one analyzer of the plurality of analyzers includes a custom analyzer that analyzes a set of custom rules provided by the user. In these implementations, the set of custom rules may include Internet Protocol (IP) range classification. Further, the set of default rules may include a firewall configuration rule. In various implementations, the configuration status may include any of one or more configuration errors, a list of resources affected by the one or more configuration errors, or at least one recommendation for adjusting a configuration of the network.

Further, analyzing the data packet may include parsing, by the plurality of analyzers, the network model to retrieve network information. In some implementations, the operations include obtaining an indication indicating a configuration of the network has changed and a second data packet configured for transmission across the network. In these implementations, the operations include determining, based on the changed configuration of the network, a subset of the plurality of analyzers. In these implementations, the operations include analyzing, based on the network model, the second data packet using the subset of the plurality of analyzers. In these implementations, the operations also include determining, based on the analysis of the second data packet by the subset of the plurality of analyzers, a second configuration status of the network. In these implementations, the operations include reporting the second configuration status to the user.

In some examples, the operations include, after a predetermined amount of time has elapsed since reporting the configuration status to the user, determining, based on analysis of a second data packet, a second configuration status of the network and reporting the second configuration status to the user.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Updating network configurations in cloud computing projects can be difficult, as even small errors can lead to network outages. For example, when updating a network firewall, an administrator may inadvertently add a firewall for a default service needed for the network to function correctly. Manually checking for such errors when updating network configurations can be inefficient and inaccurate. Even when changes do not lead to immediate network outages, configuration changes may not follow recommended guidelines that lead to issues at a later date. For example, performance of one or more services may be degraded or security may be reduced when opening a firewall rule that allows untrusted external traffic.

Implementations herein include a system that monitors cloud computing project configurations, triggers configuration based validation based on real-time events (i.e., changes to network settings), identifies errors/failures, correlates failures with changes to identify root causes, and/or provides accurate recommendations to fix the issues. The system is scalable and self-serviceable to cover all networking features to assist users to avoid common configuration setup failures or regression and suggest best-practices for better security and performance.

Figure 1:
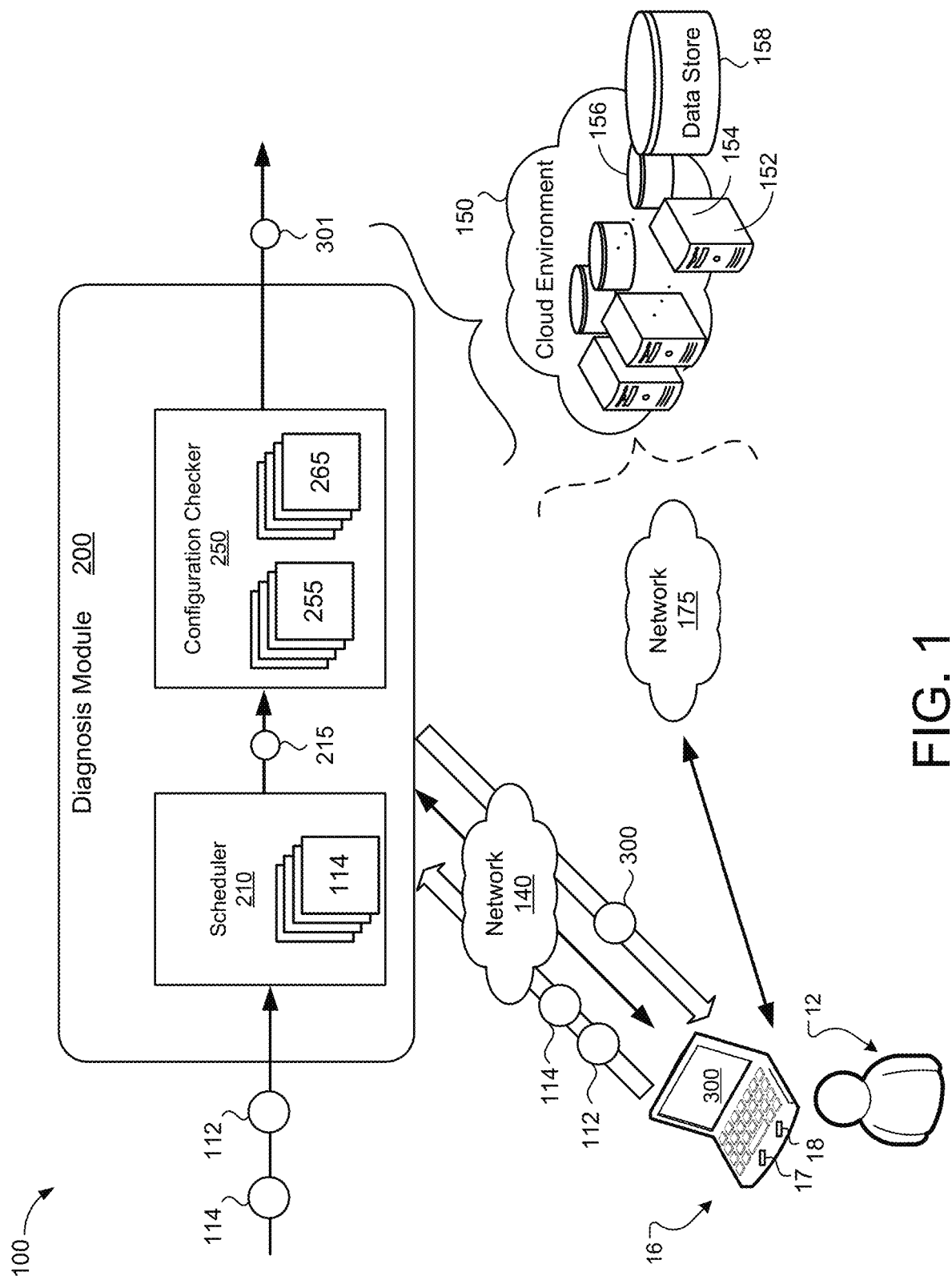
FIG. 1 is a schematic view of scalable event driven auto-diagnosis system for networks.

Referring now to FIG. 1, a scalable event driven auto-diagnosis system 100 includes a user device 16 having a user interface 300. The user device 16 may correspond to any computing device, such as a desktop workstation, a laptop workstation, or a mobile device (i.e., a smart phone). The user device 16 includes computing resources 17 (e.g., data processing hardware) and/or storage resources 18 (e.g., memory hardware). The user device 16 may be configured to make changes to a network 175. For example, the user device 16 may be configured with administrative access to a cloud-based computing network 175 where user 12 can change one or more network configuration settings. In particular, user 12 can change any applicable network parameter or setting of the network 175 such as a firewall configuration, an IP address, a host name, a router address, etc.

In some implementations, the user device 16 is in communication with a remote system 150 (also referred to herein as a cloud computing environment) via a communication network 140. The remote system 150 may be a single computer, multiple computers, or a distributed system (e.g., a cloud environment) having scalable/elastic resources 152 including computing resources 154 (e.g., data processing hardware) and/or storage resources 156 (e.g., memory hardware). A data store 158 (i.e., a remote storage device) may be overlain on the storage resources 146 to allow scalable use of the storage resources 146 by one or more user device 16 or the computing resources 154. In some implementations, the network 175 is a cloud computing network within or part of the remote system 150. The network 140 may be the same as the network 175 or different. In some examples, the remote system 150 executes a diagnosis module 200 to provide scalable event driven auto-diagnosis of any configuration changes 112 made to network 175. In other examples, the diagnosis module executes at least partially on the user device 16 (e.g., on the data processing hardware 17).

In some implementations, a user 12 of the user device 16 enters one or more configuration changes 112 to network 175. For example, the user 12 changes a firewall setting/rule of the network 175. The diagnosis module 200 may obtain a list of changes 112 to the network 175 in real-time (i.e., as or shortly after the user 12 changes one or more parameters or settings of the network 175). The diagnosis module 200 includes a scheduler 210 and a configuration checker 250. The scheduler 210 is responsible for obtaining updates to the network 175 (e.g., the list of changes 112) and pushing messages to the configuration checker 250. The scheduler 210 may push messages as updates are received or may send batched messages in periodic intervals. Accordingly, the changes to the network 175 can be tested in real time or at a specific interval (e.g., hourly). In response to obtaining the list of changes 112, the scheduler 210 may determine one or more analyzers 255 impacted by the list of changes 112. The scheduler 210 transmits, to the configuration checker 250, an activation indication 215 indicating the analyzers 255 to be activated in response to the list of changes 112. Each analyzer may correspond to a specific configuration validation rule that can produce insights with different failure causes and severities. For example, a specific analyzer 255 is directed to IP address allocation in the network 175 and is only activated when changes are made to IP address allocation. Accordingly, the analyzers 255 enable the diagnosis module 200 to test only the configurations in the network 175 that have been changed (as opposed to testing the entire network 175 in response to each change) allowing the testing to be more efficient, dynamic, and scalable. The configuration checker 250, in some examples, activates the appropriate analyzers 255 (i.e., the analyzers 255 indicated by the indication 215) to analyze each change 112 in the list of changes 112 using a network model 265 (representative of the network 175) to determine whether the changes 112 result in any errors and/or failures. In some implementations, the configuration checker 250 tests an example data packet 114 against the changes in the network 175 based on the list of changes 112 using the analyzers 255 and the network model 265. Based on the output of the configuration checker 250, the diagnosis module 200 may transmit a configuration status 301 to the user device 16 for display at the user interface 300.

In some implementations, the scheduler 210 obtains a data packet 114 (or an indication or a representation of the data packet 114) for transmission across the network 175 from a source address to a destination address. The data packet 114 may be a test message used to test updates to the network 175. In other implementations, the data packet 114 may be a real message (or an indication or a representation of the message) to be transmitted over the network 175 that is provided by the user 12 and/or intercepted from the network 175. In response to obtaining the data packer 114, the scheduler 210 determines one or more analyzers 255 impacted by the data packet 114. The scheduler 210 may transmit the activation indication 215 indicating the analyzers 255 to be activated in response to the data packet 114. The configuration checker 250, in some examples, activates the appropriate analyzers 255 to analyze data packet 114 to determine whether the data packet 114, when transmitted across the network 175 from the source address to the destination address, would result in any errors and/or failures and/or issues. The configuration checker 250 simulates/recreates the network 175 using the network model 265. Based on the output of the configuration checker 250, the diagnosis module 200 transmits the configuration status 301 to the user device 16 for display at the user interface 300. In some implementations, the configuration status 301 is based on a correlation between the list of changes 112 to the network 175 and the analysis of the data packet 114 using the analyzers 255 and the network model(s) 265, as discussed in greater detail below (FIG. 2).

The configuration status 301 may indicate any applicable information regarding the current or future operability of the network 175. Further, the configuration status 301 may be presented as a graphic, a text document, a spreadsheet, or any other suitable form. In some implementations, the configuration status 301 indicates the current status of the network 175 based on one or more recent configuration changes of the network 175. For example, the scheduler 210 may obtain a list of changes 112 in real-time (i.e., once the changes are entered by the user 12). The diagnosis module 200 may determine an updated configuration status 301 in response to the obtained list of changes 112. Alternatively, the scheduler 210 obtains a list of changes 112 and/or data packets 114 periodically at scheduled intervals and updates the configuration status accordingly.

The system of FIG. 1 is presented for illustrative purposes only and is not intended to be limiting. For example, although only a single example of each component is illustrated, any number of components 16, 175, 200, and 150, may be communicatively coupled to the system 100. Further, although some components are illustrated as being located in a cloud computing environment 150, in some implementations those components may be hosted on the user device 16. Alternatively, although some components are illustrated as being hosted on the user device 16, in some implementations those components are hosted in a cloud computing environment 150. Further, in various implementations, some or all of the components 200, 210, and/or 250 are hosted on user device 16, remotely (such as in cloud computing environment 150), or some combination thereof.

Figure 2:
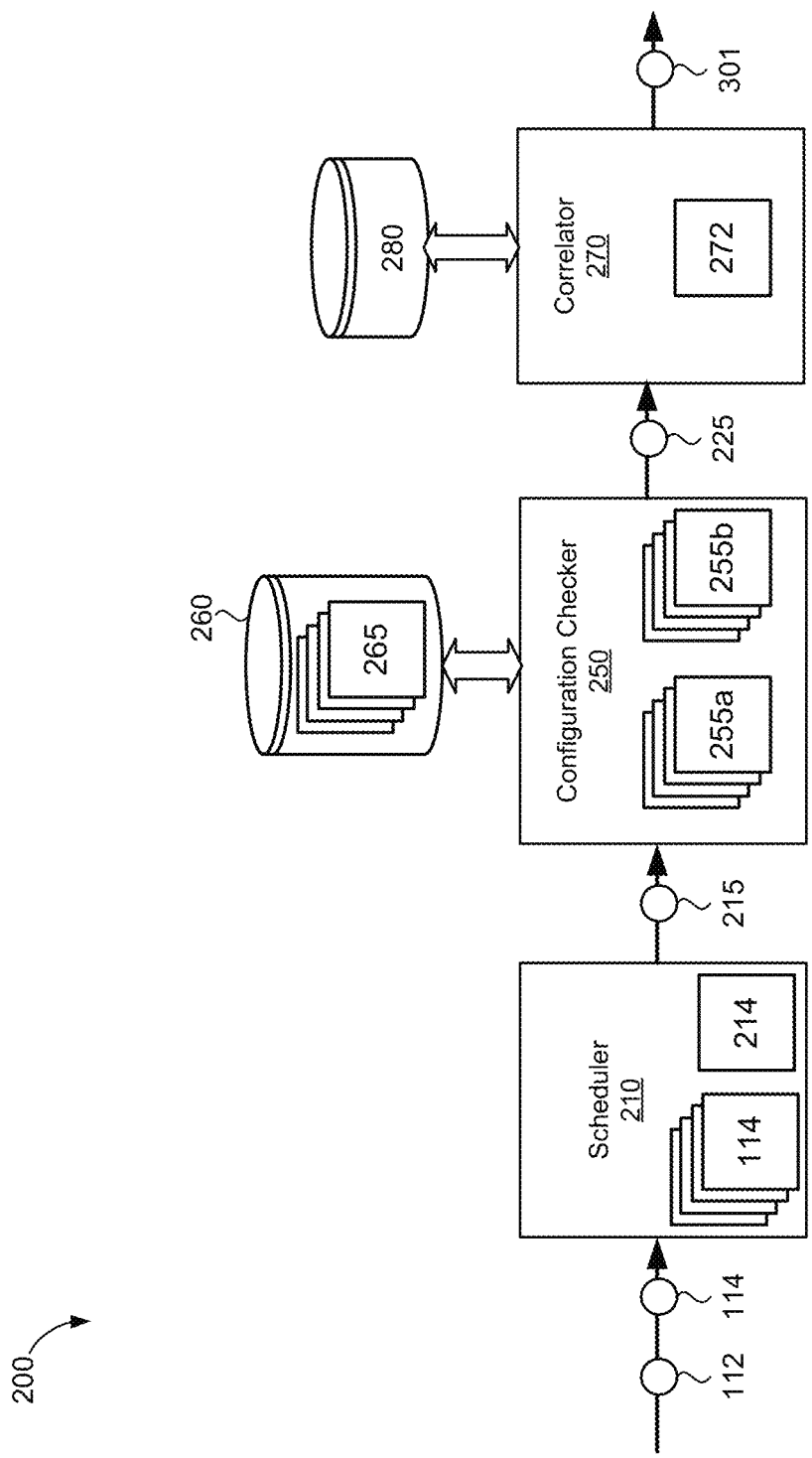
FIG. 2 is a schematic view of exemplary components of the system of FIG. 1.

FIG. 2 includes the diagnosis module 200 of FIG. 1. As described above, the diagnosis module 200 may implement the scheduler 210 to obtain inputs, such as a list of changes 112 to network 175 and/or a data packet 114 (or indication of a data packet 114) transmitted on the network 175. In some implementations the scheduler 210 is an independent logic that resides outside of the diagnosis module 200. In some examples, the scheduler 210 triggers the intended services (i.e., the analyzers 255) based on monitoring configuration and event updates (i.e., the obtained inputs 112, 114). In some implementations, the scheduler 210 is a generic module that works for multiple networks 175. The scheduler 210 may send the indication 215 periodically based on a time interval and/or in response to the obtained inputs 112, 114. For example, the scheduler 210 obtains each change to the network 175 in a list of changes 112 and pushes the indication 215 as a batch message triggering a test of the network 175 and indicating the analyzers 255 to be activated in the testing. In another example, the scheduler 210 sends an indication 215 in response to each change made to the network 175. Further, each indication 215 may include an indication of the data packet 114 (either a test data packet 114 or an actual data packet 114 transmitted on the network 175) to be used in testing the network 175. The scheduler 210 may obtain inputs 112, 114 from a data source outside of the diagnosis module 200 and may implement a streaming service to process real-time events. In other implementations, the scheduler 210 processes snapshots of the network 175 periodically (e.g., every hour, every six hours, every day, etc.) for reconciliation purposes.

Optionally, the scheduler 210 determines one or more default analyzers 255, 255a and/or one or more custom analyzers 255, 255b corresponding to the list of changes 112 and/or the data packet 114. The default analyzers 255a generally do not require any user input/configuration. In other words, the default analyzers 255a may be "out-of-the-box" rules. For example, a generic network configuration includes one or more firewall configurations, IP ranges, etc. The default rules 255a are common across these generic networks 175 and are typically applicable to different customers and networks. The default analyzers 255a may include analyzers 255 belonging to such categories as service, connectivity, dependency, security, optimization, etc. The custom analyzers 255b are configured by the user 12 based on a specific network 175 setup. For example, a user network can include a custom Internet Protocol (IP) range classifications, where a user 12 can configure source IP range to destination IP range to be reachable, isolated, or through a certain path. The example IP range is based on customized values and is unique to the user's network 175. Accordingly, a custom analyzer 255b may be necessary when testing changes to the example network 175 due to the custom IP range. In some implementations, the scheduler 210 stores a list of rule-based triggers 214 mapping each analyzer 255 to related resources of the network 175. For example, a custom analyzer 255b is a configuration of a particular organization. When the scheduler 210 obtains the data packet 114 corresponding to the particular organization, the scheduler 210 can look up the corresponding custom analyzer 255b using the rule-based trigger 214. The scheduler 210 may transmit the activation indication 215 indicating which analyzers 255 appropriate for analyzing the obtained list of changes 112 and/or data packet 114.

In some implementations, the scheduler 210 analyzes the obtained inputs 112, 114 to determine whether the configuration checker 250 should execute (i.e., whether an analysis using the network model(s) 265 should be performed). For example, the scheduler 210 receives a first data packet 114 and transmits an activation indication 215 to the configuration checker 250 to analyze the data packet 114 to determine a configuration status 301. If the scheduler 210 receives a second data packet 114 that is substantially similar to the first data packet 114, then the scheduler determines that the configuration status 301 does not need to be updated. Alternatively, if the second data packet 114 is sufficiently different from the first packet 114, the scheduler 210 determines the appropriate analyzer(s) 255 (e.g., using the rule-based trigger 214) and transmits the activation indication 215 to the configuration checker 250 to update the configuration status 301 (or determine a new configuration status 301) based on the second data packet 114. For example, a scheduler 210 transmits a first activation indication 215, in response to a first list of changes 112, indicating a plurality of analyzers 255. The configuration checker 250 analyzes a first data packet 114 transmitted on the network 175, using the plurality of analyzers 255 and network model 265, to determine a configuration status 301. The scheduler 210 then obtains a new list of changes 112. In response to the new list of changes 112, the scheduler 210 then transmits a second activation indication 215 indicating a second plurality of analyzers 255. Here the second plurality of analyzers 255 can be a subset of the first plurality of analyzers 255 if the new list of changes 112 includes a portion of the original list of changes 112. The configuration checker 250 then analyzes a second data packet 114 transmitted on the network 175 using the second plurality of analyzers 255 and network model 265, to determine a second configuration status 301. In another example, the scheduler 210 transmits an activation indication 215 after a predetermined amount of time has elapsed since reporting the configuration status 301.

The configuration checker 250 may perform diagnostics on the network 175 using the analyzers 255 and a network model 265 based on the obtained inputs 112, 114. In some implementations, the configuration checker 250 is communicatively coupled to a model data store 260 to retrieve a network model 265 that represents the network 175 during testing. The configuration checker 250 implements/executes the analyzers 255 based on the activation indication 215 such that the diagnostic analysis of the changes to network 175 are performed efficiently (i.e., only relevant analyzers 255 are triggered). For example, the configuration checker 250 parses the network model 265 based on the activated analyzers 255 allowing the configuration checker 250 to only test the configurations of the network 175 that have been changed. Thus, the configuration checker 250, when analyzing how the data packet 114 is transmitted on the network 175 (using the network model 265) only tests the changed portions (based on the list of changes 112) rather than the entire network 175. The configuration checker 250 may manage the analyzers 255 during each configuration check (i.e., network diagnostic) and merge and adjust the analyzers 255 as needed based on changes to the network 175 and/or one or more network models 265.

Each analyzer 255 may run a specific configuration validation rule that can produce insights with different failure causes and severities. For example, an Internet Protocol (IP) utilization analyzer can report low severity insight of unused external IP address, or medium severity insight that a subnet has more than 80% of IP address allocation. The analyzers 255 may be categorized as network core or services. For example, network core analyzers 255 include basic virtual private cloud (VPC) setup and connectivity related configurations, such as IP address, routes, firewalls, VPC peering, shared VPC, hybrid connectivity etc. As another example, service analyzers 255 include the network services or managed services. For service analyzers 255 that focus on verifying the connectivity to/from service to other network endpoints, a connectivity correlator 270 may provide a packet 114 based connectivity simulation to identify configuration issues that prevent reachability.

The configuration checker 250 may generate a result 225 based on the output of each activated analyzer 255 used to analyze the list of changes 112 to the network 175 and/or the data packet 114 transmitted on the network 175. The result 225 may include a high level summary detailing the number of resources of the network 175 that were analyzed and the resources involved in the analysis. The result 225 may also include a list of findings that includes a severity type (e.g., low, warning, error, etc.), a configuration error, detailed information (e.g., list of resources impacted, specific changes to correct the error), and the like.

In some implementations, the result 225 is processed by the correlator 270 using a failure correlation module 272 and data from an insight store 280. The correlator 270 may be used to provide a packet-based (i.e., the data packet 114) connectivity simulation to identify configuration issues that prevent reachability. The failure correlation module 272 may provide root cause analysis, specifically, correlating changes that could be the cause of newly discovered issues/failures in the network 175 based on changes from the list of changes 112. In particular, the correlator 270 may correlate the result 225 (which indicates the analysis of the packet 114 being transmitted on network 175 using analyzers 255 based on the list of changes 112 and using a network model 265 corresponding to the network 175) with one or more changes of the list of changes 112. As a simple example, if only a single analyzer 255 is activated for testing a single change to the network 175 and the result 225 indicates that the network fails, the correlator 270 can correlate the failure to the configuration corresponding to the single analyzer 255. Thus, the correlator 270 correlates the results 225 to the list of changes 112 in order to identify the changes that cause issues on the network 175. When the scheduler 210 triggers/indicates an analyzer 255, the scheduler 210 may also send the list of changes 112. The correlator correlates the list of changes 112 to the newly discovered insight (i.e., result 225). Each portion of the result 225 may include metadata to describe the type of failure and what resources are targeted and/or responsible. Thus, the correlator 270 may use the metadata to compare the result 225 to the list of changes 112 to identify the one or more changes that cause the failure in the network 175. The correlator 270, in some examples, provides recommendations to fix, correct, or otherwise mitigate issues of the network 175 based on historical data (e.g., by suggesting settings that were in place in previous iterations when the issue did not exist on the network 175). The correlator 270 may generate a configuration status 301 based on the correlation between the results 225 and the list of changes 112.

In some implementations, an insight store 280 is a persistence database that stores current and historical results of the analyzer 255 and the correlator 270 (e.g., results 225), to be able to support a user's query of historical data. The insight store 280 may support insight states transition initiated by the user 12 and/or automatically detected by the system 100. In this manner, if an issue is resolved, the correlator 270 may be able to use historical data to determine one or more changes the led to the resolution in the network 175.

Figure 3:
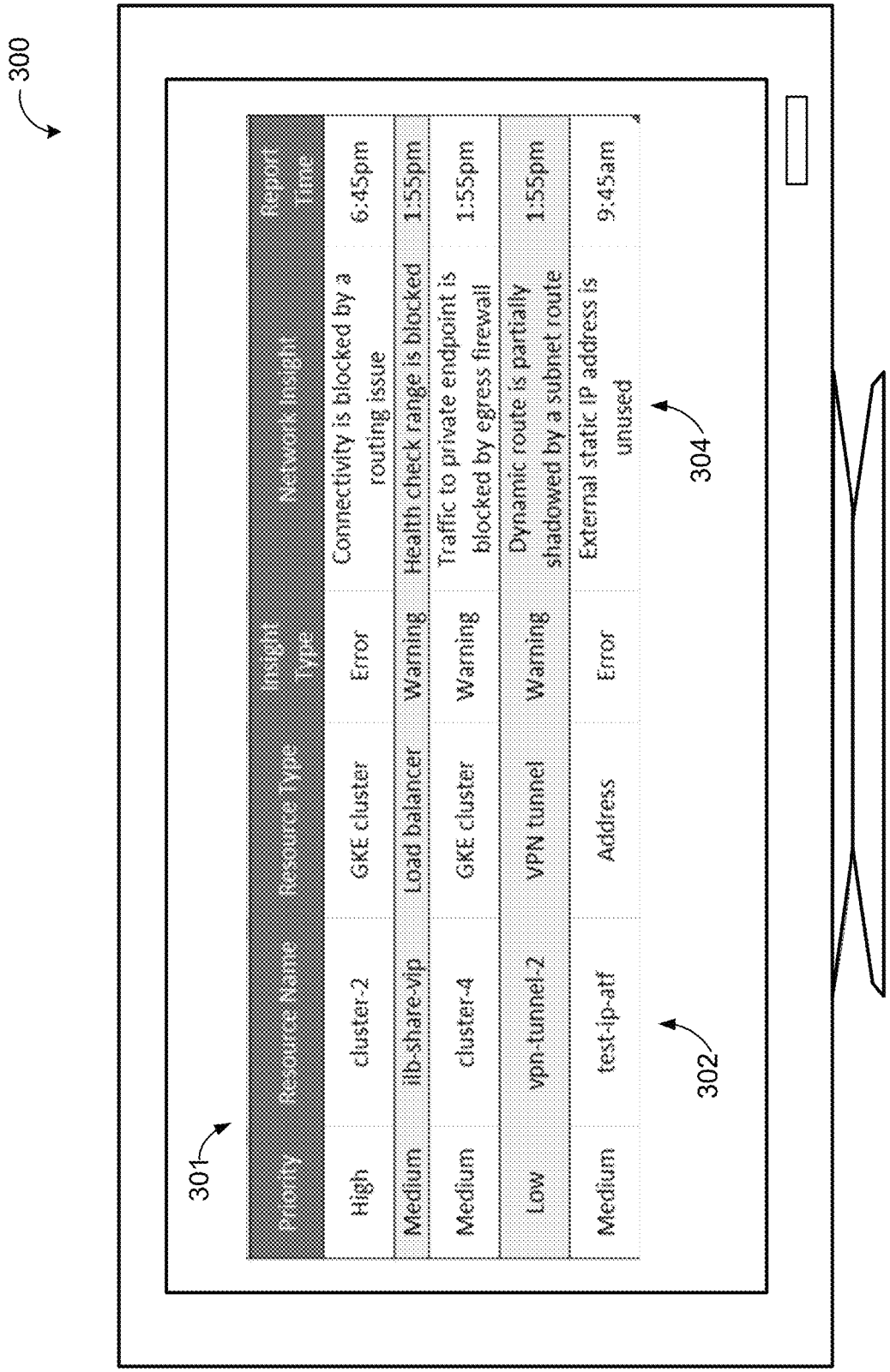
FIG. 3 is a schematic view of an exemplary user interface of the system of FIG. 1.

FIG. 3 includes an example user interface 300 displaying a configuration status 301. The configuration status 301 may include a list of reports. Each report, in some examples, includes a specific failure or finding corresponding to the network 175. For example, the configuration status 301 indicates a list of configuration errors 304 (i.e., configuration parameters that are incorrect and/or may cause the network 175 to fail or operate inefficiently or ineffectively) and the resources 302 affected by the one or more configuration errors 304. In some implementations, the configuration status 301 includes one or more recommendations for adjusting configurations of the network 175. For example, the configuration status 301 provides a replacement configuration (not shown) and/or a range of inputs that could remedy the configuration errors 304. In another example, the configuration status 301 indicates that a firewall should be enabled or that one or more sources should be allowed through a firewall. The example configuration status 301 of FIG. 3 is not intended to be limiting, and any indication of the operability of the network 175 may be included as part of the configuration status 301. Further, the configuration status 301 may be updated as new inputs are obtained. For example, if one or more changes are made to the network 175, the diagnosis module 200 obtains a list of changes 112 and updates (or determines a new) configuration status 301 accordingly.

Figure 4:
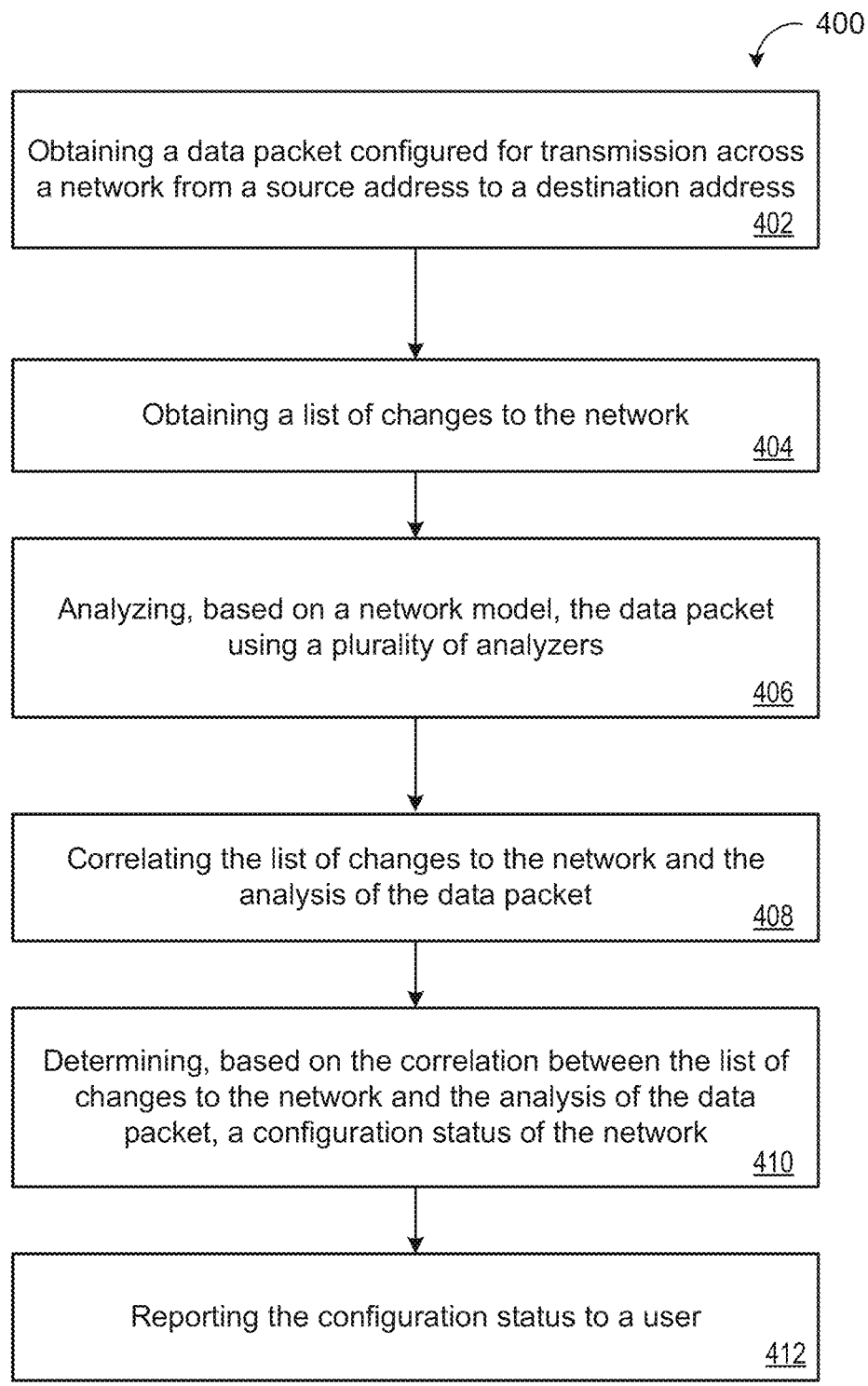
FIG. 4 is a flowchart of an example arrangement of operations for a method for scalable event driven auto-diagnosis.

FIG. 4 is a flowchart of an exemplary arrangement of operations for a method 400 of scalable event driven auto-diagnosis systems. The method 400 may be performed by various elements of the scalable event driven auto-diagnosis system 100 of FIG. 1 and/or the computing device 500 of FIG. 5. For example, the data processing hardware 154 of the remote system 150 of FIG. 1 may execute instructions stored on the memory hardware 156 to cause the data processing hardware 154 to perform the operations of the method 400. At operation 402, the method 400 includes obtaining a data packet 114 configured for transmission across a network 175 from a source address to a destination address. At operation 404, the method 400 includes obtaining a list of changes 112 to the network 175. At operation 406, the method 400 includes analyzing, based on a network model 265, the data packet 114 using a plurality of analyzers 255. At operation 408, the method 400 includes correlating the list of changes 112 to the network 175 and the analysis of the data packet 114. At operation 410, the method 400 includes determining, based on the correlation between the list of changes 112 to the network 175 and the analysis of the data packet 114, a configuration status 301 of the network 175. At operation 412, the method 400 includes reporting the configuration status 301 to a user 12.

Figure 5:
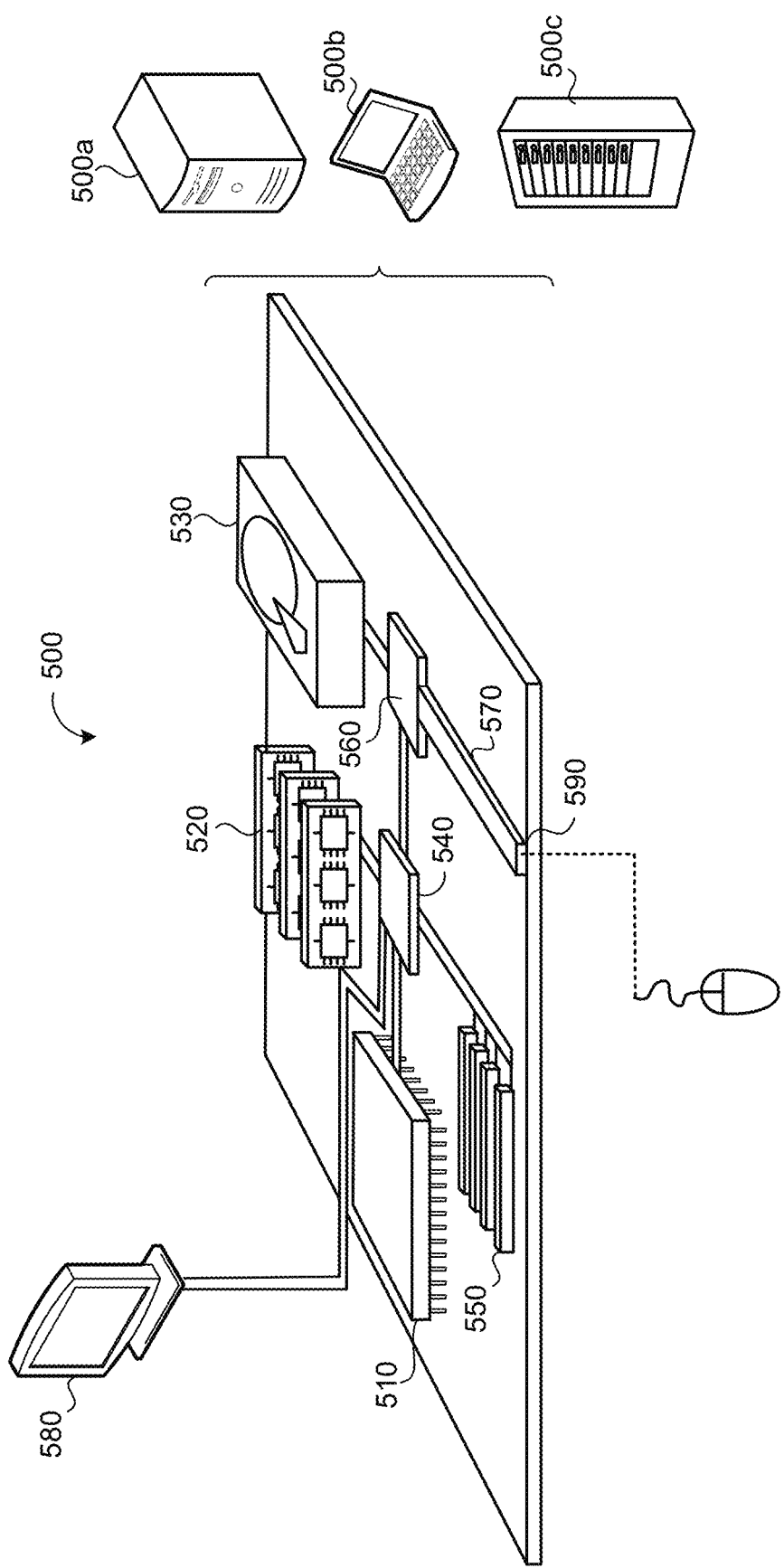
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    obtaining a data packet configured for transmission across a network from a source address to a destination address;
    obtaining a list of changes to the network, the list of changes comprising one or more configuration changes to the network;
    selecting, based on the list of changes, a plurality of analyzers from a set of analyzers to analyze the data packet, the set of analyzers including one or more analyzers not in the plurality of analyzers, each analyzer of the plurality of analyzers corresponding to:
        a respective configuration change of the one or more configuration changes of the list of changes; and
        a specific configuration validation rule for determining failure causes and failure severities different from each other specific configuration validation rule of the other analyzers of the plurality of analyzers;
    for each respective selected analyzer of the plurality of analyzers, analyzing, based on a network model, the data packet using the respective selected analyzer by applying only the specific configuration validation rule corresponding to the respective selected analyzer to the analysis;
    correlating the list of changes to the network and the analysis of the data packet;
    determining, based on the correlation between the list of changes to the network and the analysis of the data packet, a configuration status of the network; and
    reporting the configuration status to a user.

2. The method of claim 1, wherein at least one analyzer of the plurality of analyzers comprises a default analyzer that analyzes a set of default rules.

3. The method of claim 2, wherein the set of default rules comprises a firewall configuration rule.

4. The method of claim 1, wherein at least one analyzer of the plurality of analyzers comprises a custom analyzer that analyzes a set of custom rules provided by the user.

5. The method of claim 4, wherein the set of custom rules comprises Internet Protocol (IP) range classification.

6. The method of claim 1, wherein the configuration status comprises one or more configuration errors.

7. The method of claim 6, wherein the configuration status comprises a list of resources affected by the one or more configuration errors.

8. The method of claim 1, wherein analyzing the data packet comprises parsing, by the plurality of analyzers, the network model to retrieve network information.

9. The method of claim 1, wherein the operations further comprise:
obtaining an indication indicating a configuration of the network has changed;
obtaining a second data packet configured for transmission across the network;
determining, based on the changed configuration of the network, a subset of the plurality of analyzers;
analyzing, based on the network model, the second data packet using the subset of the plurality of analyzers;
determining, based on the analysis of the second data packet using the subset of the plurality of analyzers, a second configuration status of the network; and
reporting the second configuration status to the user.

10. The method of claim 1, wherein the operations further comprise, after a predetermined amount of time has elapsed since reporting the configuration status to the user:
determining, based on analysis of a second data packet, a second configuration status of the network; and
reporting the second configuration status to the user.

11. The method of claim 1, wherein the configuration status comprises at least one recommendation for adjusting a configuration of the network.

12. A system comprising:
data processing hardware; and
memory hardware in communication with the data processing hardware, the memory hardware storing instructions that when executed on the data processing hardware cause the data processing hardware to perform operations comprising:
obtaining a data packet configured for transmission across a network from a source address to a destination address;
obtaining a list of changes to the network, the list of changes comprising one or more configuration changes to the network;
selecting, based on the list of changes, a plurality of analyzers from a set of analyzers to analyze the data packet, the set of analyzers including one or more analyzers not in the plurality of analyzers, each analyzer of the plurality of analyzers corresponding to:
a respective configuration change of the one or more configuration changes of the list of changes; and
a specific configuration validation rule for determining failure causes and failure severities different from each other specific configuration validation rule of the other analyzers of the plurality of analyzers;
for each respective selected analyzer of the plurality of analyzers, analyzing, based on a network model, the data packet using the respective selected analyzer by applying only the specific configuration validation rule corresponding to the respective selected analyzer to the analysis;
correlating the list of changes to the network and the analysis of the data packet;
determining, based on the correlation between the list of changes to the network and the analysis of the data packet, a configuration status of the network; and
reporting the configuration status to a user.

13. The system of claim 12, wherein at least one analyzer of the plurality of analyzers comprises a default analyzer that analyzes a set of default rules.

14. The system of claim 13, wherein the set of default rules comprises a firewall configuration rule.

15. The system of claim 12, wherein at least one analyzer of the plurality of analyzers comprises a custom analyzer that analyzes a set of custom rules provided by the user.

16. The system of claim 15, wherein the set of custom rules comprises Internet Protocol (IP) range classification.

17. The system of claim 12, wherein the configuration status comprises one or more configuration errors.

18. The system of claim 17, wherein the configuration status comprises a list of resources affected by the one or more configuration errors.

19. The system of claim 12, wherein analyzing the data packet comprises parsing, by the plurality of analyzers, the network model to retrieve network information.

20. The system of claim 12, wherein the operations further comprise:
obtaining an indication indicating a configuration of the network has changed;
obtaining a second data packet configured for transmission across the network;
determining, based on the changed configuration of the network, a subset of the plurality of analyzers;
analyzing, based on the network model, the second data packet using the subset of the plurality of analyzers;
determining, based on the analysis of the second data packet using the subset of the plurality of analyzers, a second configuration status of the network; and
reporting the second configuration status to the user.

21. The system of claim 12, wherein the operations further comprise, after a predetermined amount of time has elapsed since reporting the configuration status to the user:
determining, based on analysis of a second data packet, a second configuration status of the network; and
reporting the second configuration status to the user.

22. The system of claim 12, wherein the configuration status comprises at least one recommendation for adjusting a configuration of the network.

* * * * *